UNITED STATES PATENT OFFICE.

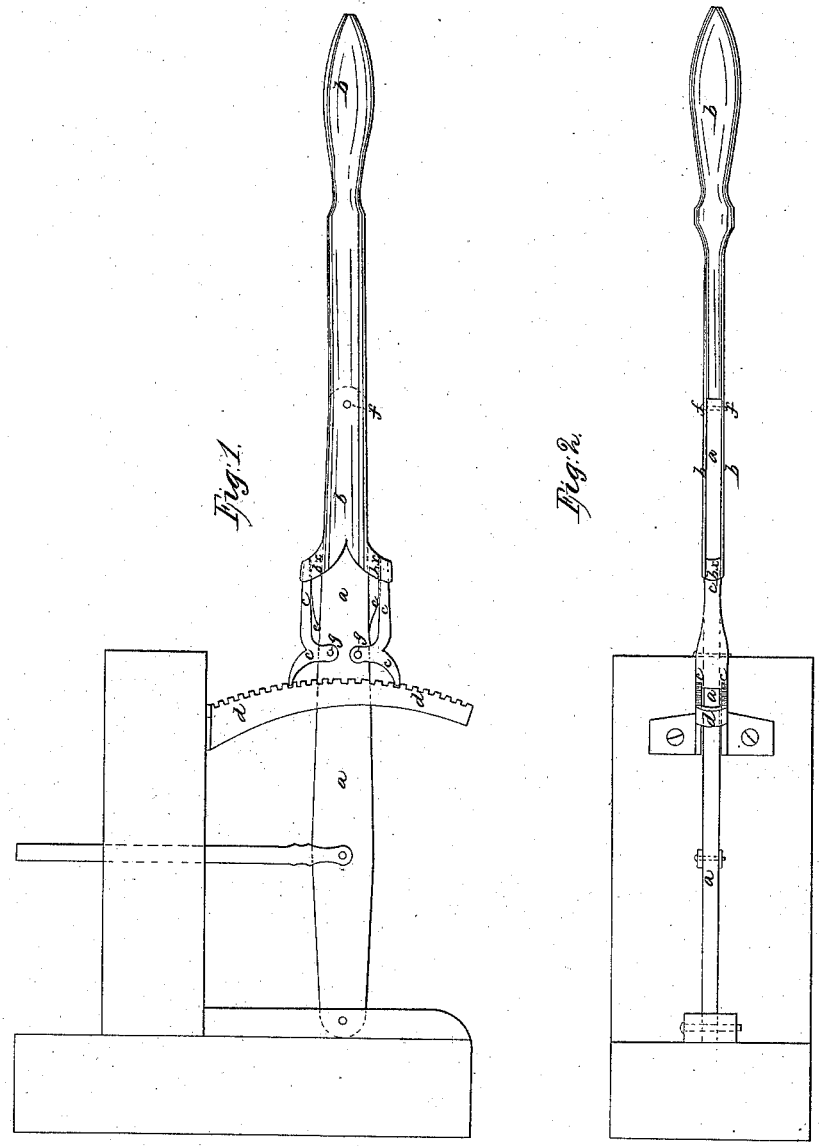

HIRAM BALDWIN, OF NASHUA, NEW HAMPSHIRE.

RATCHET-LEVER.

Specification forming part of Letters Patent No. 10,955, dated May 23, 1854.

*To all whom it may concern:*

Be it known that I, HIRAM BALDWIN, of Nashua, in the county of Hillsborough and State of New Hampshire, have invented a new and useful ratchet-lever or mode of combining with the moving levers or gates of any machinery whatever a self-acting dog and ratchet, which shall maintain the lever or gate in any desired position, or allow it to be moved freely in either direction by the simple application of the usual moving force; and I do hereby declare that the following is a full and exact description thereof, reference being had to the accompanying drawing and to the letters of reference marked thereon.

To illustrate the invention, I will proceed to describe it as applied to the lever of a locomotive throttle-valve, represented by the drawing.

$a\ a\ a$ is the lever.

$b\ b\ b$ is a false handle, secured to the lever by the fulcrum-pin $f\ f$, and passing down on each side of the lever encircles it at the part marked $b\ x$ in such manner as to allow the lower end of the handle in this example about three-fourths of an inch play on each side, forward and back.

$c\ c\ c\ c$ are dogs or catches, attached to the lever by the fulcrum-pins $g\ g$. The lower or tooth ends serve as catches in the ratchet below, and the upper ends pass into the space between the lever $a$ and the part of the false handle marked $b\ x$. They are held in position by the springs $e\ e$, which are attached to the dogs and press against the sides of the lever.

$d\ d\ d$ is a toothed ratchet, secured to some immovable part of the engine, and as here represented is slotted through the middle to admit the lever. While the lever is left at rest, the dogs being held within the teeth of the ratchet by the springs $e\ e$, it is perfectly immovable in either direction.

To open the valve the engine man takes hold of the top of the false handle and pulls toward him. This handle, encircling the lever loosely at $b\ x$ and moving on the pin $f$ as a fulcrum, presses the upper end of the dog $c\ c$ firmly against the side of the lever, and thereby lifts the tooth end of the dog from the ratchet, leaving the lever free to move in the required direction. The false handle and the lever being then firmly in contact at two points, they move in the required direction precisely as they would if the handle were a rigid attachment. Having moved it the required distance, and the handle being let go, the dog is again thrown by its spring into the ratchet and the lever is immovable. To shut the valve the pushing of the handle operates in a similar manner on the opposite dog, and thus by the simultaneous movement of the handle and the dog on the side to which the movement is to be effected I obtain a ratchet-lever which moves freely by the usual application of the moving power to the handle, but is perfectly secure in whatever position it is left.

What I claim as my invention, and desire to secure by Letters Patent, is—

The application of a dog and ratchet to any moving lever or wheel in such manner that the usual application of the moving power to the lever or wheel simultaneously lifts the tooth of the dog from the ratchet on the side to which the lever or wheel is to be moved, or the removal of that power allows it to fall back in its place, rendering the lever or wheel immovable, except in the manner described; and I claim the application of this invention not only to the moving levers of machinery generally, but as also applicable to the securing of ships' tillers or rudders, or to any other like purpose.

Nashua, October 1, 1853.

HIRAM BALDWIN.

In presence of—
 DANIEL BIXBY, Jr.,
 WM. S. PORTER.